United States Patent Office 3,677,782
Patented July 18, 1972

3,677,782
PIGMENTARY FORM OF AN AZOMETHINE
Ian Alexander Macpherson, Paisley, Renfrewshire, Eric Richard Inman, Bridge of Weir, Renfrewshire, John Andrew Stirling, Glasgow, and Alexander McHugh Irvine, Paisley, Renfrewshire, Scotland, assignors to Ciba-Geigy AG, Basel, Switzerland
No Drawing. Filed May 20, 1970, Ser. No. 39,162
Claims priority, application Great Britain, May 23, 1969, 26,502/69
Int. Cl. C09c; C07f 1/08
U.S. Cl. 106—288 Q    16 Claims

ABSTRACT OF THE DISCLOSURE

The pigmentary form of a metallised o,o'-dihydroxyphenyl-naphthyl azomethine is produced by comminuting it to a mean particle size not exceeding 2.0 microns.

DETAILED DESCRIPTION

The present invention relates to organic pigmentary colouring matters, and in particular to the production in pigmentary form of a metallised azomethine compound suitable for using in the colouration of a wide variety of organic materials and having good pigmentary properties.

According to the present invention, there is provided in pigmentary form the compound having the formula I:

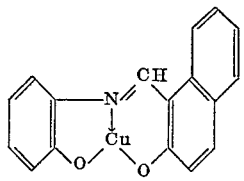

having a mean particle size not exceeding 2.0 microns.

The invention also comprises processes of conditioning the non-pigmentary form of the compound of Formula I in order to produce the pigmentary form of this compound in accordance with the present invention.

It is already known from U.S. patent specification 2,116,913 that pigments can be produced by the metallisation of o,o'-dihydroxy diaryl azomethines; however, these products do not meet present day requirements of strength and fastness to light and acids. British patent specification 1,122,938 claims the achievement of an improvement in tinctorial strength and capability of direct pigmentary preparation by the use of the phenyl substituted azomethine complex of Formula II:

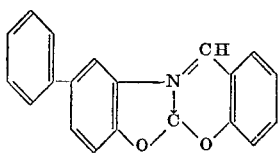

However, this product has a transparency and a strength, which is not as good as desired.

We have now found that the simple unsubstituted compound of Formula I can be prepared in a pigmentary condition and that most surprisingly in view of its simple constitution and its long availability as a chemical compound, this pigment has properties meeting modern requirements.

Furthermore we have found means by which this compound can be prepared directly without the use of organic solvents in a form pure enough for immediate pigmentary use without any additional conditioning process being required. By avoiding the use of organic solvents it is possible to effect substantial economics. The products can be prepared in simple equipment and the health and safety hazards inherent in the use of organic solvents are avoided as is also the expense of their disposal or recovery.

A very high degree of purity and in particular, absence of unmetallised azomethine and of coloured oxidation products, is essential if the product is to be commercially acceptable with respect to having a pure bright shade and be fast to solvents and overpainting.

The compound of Formula I has already been described in the literature, specifically by Muto in the Journal of the Chemical Society of Japan volume 76 at page 1407 (1955)—which reference was published in abstract in Chemical Abstracts volume 51 at column 17562a (1957)—and also by Kishita et al. in the Australian Journal of Chemistry volume II at page 309 (1958). In this prior art, however, the studies reported were concerned with the chemistry of the compound and no indication whatever was given that the compound could be used as a colouring matter. Still less was any indication given that the compound of Formula I could be conditioned so as to convert it into pigmentary form having outstandingly good pigmentary properties, such as overlacquering fastness and heat- and light-stability when incorporated into a wide range of organic materials which are conventionally coloured with organic pigments.

The compound of Formula I can be prepared in non-pigmentary form, for example by reacting o-aminophenol and 2-hydroxyl-1-naphthaldehyde together in an organic solvent as first described by Senior and Clarke in the Journal of the Chemical Society 1911, volume 99 at page 2082. Metallisation can be carried out using a wide variety of coppering agents.

Examples of such coppering agents include the copper salts of saturated and unsaturated aliphatic carboxylic acids having from 1 to 20 carbon atoms in the carbon chain, for instance, copper stearate, copper oleate, copper palmitate or copper linoleate and also copper salts of coconut oil fatty acids; copper salts of aromatic acids, for example copper benzoate; copper salts of alicyclic acids, for instance copper abietate or naphthenate; copper salts of mineral acids, for instance copper chloride and copper sulphate; either alone or in conjunction with ammonium hydroxide to provide cuprammonium salts, or in conjunction with copper complexing agents such as alkali metal tartrates.

The compound of Formula I is converted into pigmentary form by subjecting it to any of several techniques for rendering coloured organic material into pigmentary form. These techniques are essentially concerned with comminuting the initial material into a finely-divided form, for instance a form in which the mean particle size does not exceed 2.0 microns. The choice of the means of comminution which is to be applied in any particular case is determined to a large extent by the physical form of the starting material. Examples of various means of comminution involving different degrees of work input include shear or grinding, for instance by means of a vertically rotating shaft assembly, in the presence of a solid particulate material such as sand or a metallic salt which is removable after completion of the grinding, or by means of a horizontally rotating container in which the mixture being ground falls under gravity, or by means of vibratory energy; ball milling, in the presence of solid spheres, especially metal, ceramic or glass ball; and high-speed stirring.

If a metallic salt is employed in one or other of the grinding techniques, this salt may be, for instance, a water-soluble metal salt removable after grinding by washing out with water such as an alkali metal or alkaline earth metal salt of an organic or inorganic acid, especially of a mineral acid or of an alkanoic acid having from 1 to 4 carbon atoms in the carbon chain. Suitable examples of such salts include calcium chloride, sodium chloride, sodium acetate and mixtures of these salts. These salts may be used either alone or in conjunction with an organic solvent such as dimethylaniline or xylene.

If a ball milling technique is employed, the compound of Formula I may be dispersed in water, for instance by means of pebble milling in the presence of a dispersing agent which may be of the anionic, cationic or non-ionic type.

The compound of Formula I need not be pre-formed before the conditioning is carried out; it may be prepared during the course of the conditioning procedure. For example, the compound of Formula I may be produced by reacting together 2-hydroxy-1-naphthaldehyde, 2-aminophenol and then a coppering agent while conditioning is carried out simultaneously, for instance in a horizontally rotating gravity grinder, a grinder operated by a vertical rotating shaft, especially a sand grinder or in a grinder by vibratory action or any other comminution method compatible with the presence of the chemical reactants. In this type of conditioning a water soluble copper salt such as cupric sulphate, conveniently in the hydrated form, is particularly suitable as the coppering agent, especially in the presence of an acid buffer such as sodium acetate. If desired, a dispersing agent may also be used in these conditioning techniques.

Especially preferred however, are conditioning processes in which the compound of Formula I is prepared directly in pigmentary form without recourse to the use of organic solvents. In these processes, 2-aminophenol and 2-hydroxy-1-naphthaldehyde are first reacted together under aqueous alkaline conditions, oxidation of the reactants being prevented by the exclusion of air by the use of an inert gas atmosphere, for instance a nitrogen atmosphere or by the use of a mild reducing agent, for example sodium bisulphite, sodium dithionite, sodium sulphide or glucose. If a reducing agent is used, however, it may be necessary to isolate the azomethine formed in the reaction, and re-suspend it prior to coppering to avoid interference by the reducing agent in the subsequent coppering reaction. The azomethine may be isolated, for instance by the addition to the reaction mixture of an acid, which may itself act as the reducing agent, for example, sulphurous acid.

Coppering is carried out at temperatures from ambient to 100° C., preferably at a temperature within the range of from 80° C. to 100° C., using an aqueous solution of any water-soluble coppering agent, but preferably for instance copper acetate, cuprammonium sulphate or sodium cuprotartrate. In order to effect complete coppering, some mechanical stirring action must be exerted on the suspension either by vigorous agitation or by the use of a high speed mixer or other device. Additions of a dispersing agent may be made, if desired, to expedite the reaction.

The pigments produced in accordance with the present invention may give shades ranging from greenish yellow to reddish yellow depending on the methods of preparation and pigmentation employed. The pigments produced are suitable for use in the pigmentation of high molecular weight hydrophobic organic or other organic materials. The pigments are distinguished by their high colour strength, high resistance to solvents, outstandingly good fastness to overprinting and especially by their resistance to weathering when incorporated into surface coatings. The pigments of this invention are suitable, for example, for use in the pigmentation of high molecular weight hydrophobic organic material, for instance of paints, laquers, printing inks, rubber, synthetic polymeric materials, paper and textile materials. In general, the pigments of the present invention exhibit good fastness properties especially to light, heat, cross-lacquering and migration, and resistance to organic solvents, such as trichloroethylene, toluene and methyl ethyl ketone.

The present invention also includes a method for the colouration of an organic material capable of colouration by pigmentation which comprises incorporating into the organic material a pigmentary form of the substituted azomethine compound of Formula I. The invention also covers organic materials when so coloured.

The colouration process may be carried out, for example, by preparing the substituted azomethine compound in a finely divided state according to the process of the invention and incorporating this into the organic material.

The high molecular weight hydrophobic organic material or other organic material to be coloured by the process of the invention may be any polymeric or other organic material capable of being pigmented or otherwise coloured. The material may be, for instance, a natural or synthetic polymer or co-polymer, a coating composition for application to the surface of an article, or a printing liquid medium. However, the process of the invention is applicable with particular advantage to the pigmentation of natural or synthetic polymers or co-polymers, in the form of films or bulk material; to paints, lacquers and other surface coating compositions, or to tinting compositions for use in preparing such coating compositions; and to printing inks. Examples of polymers or co-polymers which may be pigmented by the process include vinyl chloride polymers and co-polymers; polyethylene, polyacrylonitrile, polypropylene and other polyolefines; polystyrene and polystyrene co-polymers; and natural and synthetic rubbers.

The present invention is further illustrated by the following examples. Parts and percentage shown therein are expressed by weight.

Example 1

A mixture of 258 parts of 2-hydroxy-1-naphthaldehyde, 163.5 parts of 2-aminophenol, 246 parts of anhydrous sodium acetate, 5000 parts of water and 1500 parts ceramic balls (half-inch average diameter) was placed in a pot mill and ground for 24 hours. To the ground mixture were added 378 parts of hydrated cupric sulphate as solid. Grinding was then continued for a further period of 48 hours.

The ceramic balls were then separated off by a course mesh sieve and the remainder of the mixture was filtered. The solid residue from the filtration was washed successively with water, dilute aqueous sodium hydroxide solution, and finally with water. The product was dried at 60° C. in air.

The resulting pigment was a greenish-yellow powder, having melting point above 360° C.

Example 2

86 parts of 2-hydroxy-1-naphthaldehyde were dissolved in a solution of 30 parts of sodium hydroxide and 1000 parts of water at 80° C. and the mixture allowed to cool to room temperature. To the resulting suspension was added a solution of 54.5 parts of 2-aminophenol and 20 parts of sodium hydroxide in 1000 parts of water at 30° C. After stirring for 5 minutes, 150 parts of a 50% solution of acetic acid were added giving a pH of between 5 and 6. A solution of 126 parts of copper sulphate pentahydrate in 300 parts of water was added over 5 minutes giving a brown suspension having a pH of 4. This was heated to 90° C. over 30 minutes with high speed shear agitation and held at this temperature for 1 hour. The solid was then filtered off and washed with 20,000 parts of hot water and dried at 60° C. There were thus obtained 157 parts of a strong yellow pigment having a melting point above 360° C.

Example 3

25.8 parts of 2-hydroxy-1-naphthaldehyde and 16.35 parts of 2-aminophenol were added to 750 parts of water with stirring, the system being flushed with nitrogen. The resulting suspension was heated slowly to 80° C. and a solution of 12 parts of sodium hydroxide in 100 parts of water was added, followed by a solution of 37.5 parts of anhydrous ammonium sulphate in 100 parts of water. A solution of cuprammonium sulphate, prepared by dissolving 41.25 parts of copper sulphate crystals in 150 parts of warm water and adding concentrated ammonia solution until the initial precipitate has redissolved, followed by 37.5 parts of anhydrous ammonium sulphate, was added. The mixture was stirred at 85° C. The product was filtered off, washed with water, and dried. There were thus obtained 50.4 parts of green powder.

Example 4

(A) 17.2 parts of 2-hydroxy-1-naphthaldehyde and 10.9 parts of 2-aminophenol were added to 150 parts of water with stirring. A solution of 4.2 parts of sodium hydroxide in 50 parts of water was added, followed by 15.6 parts of sodium bisulphite. The resulting suspension was heated to 90° C. and stirred. The product was filtered off, washed with water, and used directly as paste for Part B of this example. The product can also be obtained by using other reducing agents, for instance sodium dithionite, sodium sulphide, or glucose, followed by a treatment with acetic acid.

(B) The product of Part A of this example was slurried in 150 parts of water with high speed shear agitation. A solution of 30 parts of hydrated sodium acetate dissolved in 100 parts of water was added. The temperature was raised to 60° C. and a solution of 27.5 parts of copper sulphate crystals dissolved in 75 parts of water was added. The temperature was raised to 90° C. and the mixture stirred. The product was filtered off, washed with water, and dried. There were thus obtained 32.6 parts of green powder having a melting point of 355–356° C., and having a copper content of 18.4%.

Example 5

The product of Example 4, Part A, was slurried in 250 parts of water with high speed shear agitation. A solution of cuprammonium sulphate, prepared by dissolving 27.5 parts of copper sulphate crystals in 100 parts of water and adding concentrated ammonium hydroxide solution until the initial precipitate has redissolved, was added. The resulting mixture was heated to 95° C. and stirred. The product was filtered off, washed with water, and dried. There were thus obtained 33 parts of green powder, having a copper content of 19.75%.

Example 6

The procedure of Example 5 was followed except that the solution of cuprammonium sulphate was replaced by a solution of 27.5 parts of copper sulphate crystals in 200 parts of water, to which were added 55 parts of potassium tartrate and 10 parts of sodium hydroxide dissolved in 50 parts of water. There were thus obtained 34.3 parts of green powder having a melting point of 355–56° C.

Example 7

(A) 54.5 parts of 2-aminophenol and 86.0 parts of 2-hydroxy-1-naphthaldehyde were refluxed in 966 parts 2-methoxyethanol and the mixture allowed to cool to room temperature before the product was filtered off, washed with 2-methoxyethanol, followed by ethanol, and dried at 70° C. Thus were obtained 111.6 parts of yellow crystals having a melting point of 255–58° C.

(B) 26.3 parts of the product of Part A of this example were suspended in 78 parts of hot 2-methoxyethanol. To this was added a hot solution of 20 parts of cupric acetate monohydrate in 76 parts of dimethylformamide, and the resulting suspension was refluxed for 25 minutes, filtered off hot, washed with 95 parts of dimethyl-formamide, followed by ethanol and dried. Thus there was obtained a green powder having a melting point of 359–60° C.

The product was converted into a finely divided pigmentary form by milling with four times its weight of a mixture of anhydrous sodium acetate and sodium sulphate in the presence of xylene, and afterwards removing the salts by washing with water.

Example 8

The dihydroxy azomethine copper II complex prepared in Example 1 was incorporated into an alkyd melamine stoving lacquer.

A paste was formulated consisting of 1 part of the pigment and 3 parts of "Uresin B" (a commercial carbamate resin). The medium was prepared by mixing 50 parts of a 60% solution of "Beckosol 3246" (a coconut glycol alkyd resin of the non-drying type) in xylene with 30 parts of 2-methoxyethanol. The lacquer was then prepared in the conventional manner and a film of each sample was applied to cardboard. The stoving time was 30 minutes at 120° C.

The pigmentations made were: a 3% mixture comprising 0.3 part of the pigment in 10 parts of the total mixture and a tint shade reduced 1:100 with titanium dioxide. The overlacquering fastness was measured by overlacquering the film on cardboard with white lacquer containing 20% titanium dioxide and restoving at 120° C. for 30 minutes. The resultant staining of the white film was then assessed. Heat stability was assessed after restoving samples of the lacquer films at 120° C. for 30 minutes and at 180° C. for 15 minutes. The lightfastness was assessed after exposure to a xenon arc lamp by comparison with the Blue Wool Scale (British Standard 1006 (1961)). The lightfastness, heat stability and overlacquering fastness were all found to be excellent.

Example 9

The dihydroxy azomethine copper II complex prepared in Example 4 was incorporated into an emulsion paint.

A paste was formed consisting of 20 parts of the pigment, 80 parts of water and 2.5 parts of "Belloid SFD" (sodium dinaphthyl methane disulphonate; Belloid is a Registered Trademark) and milled for 48 hours with 60 parts of coarse quartz sand. The sand was removed by sieving. 0.3 part of this paste were mixed with 30 parts of "Robbialac" emulsion (a poly-vinyl-acetate emulsion) and stirred until a homogeneous mixture was obtained, and a film of the sample was applied to cardboard. A bright yellow pigmentation with excellent properties was obtained.

Example 10

60 parts of the product of Example 4 were ball milled with 138 parts of "Epok U9193" which is a solution of an unmodified butylated melamine/formaldehyde resin in n-butanol and 452 parts of xylene. 350 parts of "Epok D2103" which is a solution of a hydroxy acrylic resin, a 1:1 mixture of xylene and n-butanol, were added gradually and ball milling continued. The resulting mixture had a pigment to binder ratio of 1:5; this was adjusted to 1:10 by the addition of more resin solution and the paint was thinned to the required viscosity for spraying. Suitable articles, for instance aluminium panels were sprayed and then stoved at 120° C. for 30 minutes. The resulting paint films had excellent fastness to light, heat and acids, for example, spotting the panels with 0.1 N hydrochloric acid left no discolouration on drying, or stoving the panels at 180° C. for 30 minutes had practically no detectable effect on the colour. The resulting coated panels were a very attractive transparent yellow colour and could be oversprayed with, for example, a white paint of the same type without the yellow colour bleeding into and thus spoiling the new white finish.

When the stainer (with a 1:5 pigment to binder ratio) whose preparation is described above was combined with a suitable paste of finely powdered aluminium to give a pigment to aluminium ratio of 75:25 and the mixture was again thinned to a suitable viscosity for spraying, very attractive greenish yellow metallic coatings could be obtained which also had excellent fastness properties.

Example 11

15 parts of the product of Example 1 are stirred into 500 parts of dimethylformamide until a smooth dispersion is obtained. This dispersion is diluted with 8000 parts of dimethylformamide. To this suspension are added 1500 parts of polyacrylonitrile powder and the mixture stirred at high speed until a smooth dope has been obtained. After deaeration the dope is suitable for the preparation of films and filaments since the pigment is present in a highly dispersed form, no large particles being visible. Films of 20 thousandths of an inch thickness are drawn down on glass and dried immediately at 120° C. for 15 minutes. Bright, strong, transparent yellow films are thus obtained which show excellent fastness to light.

What we claim is:

1. The compound of the formula:

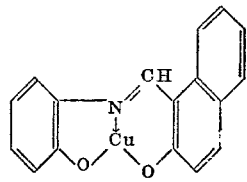

in pigmentary form having a mean particle size not exceeding 2.0 microns.

2. A process of preparing the pigmentary form of the compound of Formula I as defined in claim 1 comprising conditioning the non-pigmentary form of this compound by comminuting it in order to produce it in pigmentary form, having a mean particle size not exceeding 2.0 microns.

3. A process as claimed in claim 2 wherein the non-pigmentary form is ground with a water-soluble metal salt which is subsequently removed from the ground mixture by washing with water.

4. A process of preparing the pigmentary form of the compound of Formula I as defined in claim 1 wherein 2-hydroxy-1-naphthaldehyde, 2-aminophenol and a coppering agent are reacted together while the conditioning treatment is carried out simultaneously.

5. A process as claimed in claim 4 where the copper salt is added after the o-aminophenyl and 2-hydroxy-1-naphthaldehyde have reacted.

6. A process as claimed in claim 4 wherein the conditioning is effected in a horizontally rotating gravity grinder, a grinder operated by a vertical rotating shaft or a grinder operated by vibrating action.

7. A process as claimed in claim 6 wherein the grinder operated by a vertical rotating shaft is a sand grinder.

8. A process as claimed in claim 4 wherein the conditioning is effected by a high speed stirrer.

9. A process as claimed in claim 4 wherein the coppering agent is hydrated cupric sulphate.

10. A process as claimed in claim 2 wherein 2-hydroxy-1-naphthaldehyde and 2-aminophenol are first reacted together under aqueous alkaline non-oxidising conditions and adding thereto whilst applying mechanical stirring to the mixture, an aqueous solution of a water-soluble coppering agent.

11. A process as claimed in claim 10 wherein oxidation is prevented by the use of an atmosphere of an inert gas to exclude air.

12. A process as claimed in claim 10 wherein oxidation is prevented by the use of a mild reducing agent.

13. A process as claimed in claim 12 wherein the azomethine compound formed in the reaction is isolated from the reaction mixture and re-suspended prior to coppering.

14. A process as claimed in claim 13 wherein the azomethine compound is isolated by the addition to the reaction mixture of an acid.

15. A process as claimed in claim 14 wherein the acid has reducing properties.

16. A process as claimed in claim 14 wherein a reducing agent is added together with the acid.

References Cited

UNITED STATES PATENTS

| | | | |
|---|---|---|---|
| 2,116,913 | 5/1938 | Schmidt et al. | 260—438.1 |
| 2,239,290 | 4/1941 | Krzikalla et al. | 260—438.1 |
| 2,282,936 | 5/1942 | Chenicek | 260—438.1 X |
| 2,345,485 | 3/1944 | Krzikalla et al. | 260—438.1 |
| 2,442,200 | 5/1948 | Downing et al. | 260—438.1 X |
| 3,440,254 | 4/1969 | Lenoir et al. | 260—438.1 X |
| 2,381,952 | 8/1945 | Gubelmann | 260—438.1 X |

FOREIGN PATENTS

| | | | |
|---|---|---|---|
| 1,123,859 | 8/1968 | Great Britain | 106—288 Q |
| 1,122,938 | 8/1968 | Great Britain | 106—288 Q |

TOBIAS E. LEVOW, Primary Examiner

H.M.S. SNEED, Assistant Examiner

U.S. Cl. X.R.

106—309; 260—438.1